United States Patent [19]

Kim

[11] Patent Number: 4,895,824
[45] Date of Patent: Jan. 23, 1990

[54] ADD-ON HYDROGEN SULFIDE TRAP

[75] Inventor: Gwan Kim, Olney, Md.

[73] Assignee: W. R. Grace & Co.-Conn., New York, N.Y.

[21] Appl. No.: 96,562

[22] Filed: Sep. 8, 1987

[51] Int. Cl.$^4$ .......................... B01J 23/00; B01J 35/04
[52] U.S. Cl. ..................... 502/300; 422/171; 422/180; 423/231; 502/517
[58] Field of Search ............... 502/338, 517, 335, 336, 502/337, 325, 300; 423/231; 422/171, 180

[56] References Cited

U.S. PATENT DOCUMENTS

| | | | |
|---|---|---|---|
| 3,755,534 | 8/1973 | Graham | 422/180 X |
| 3,919,121 | 11/1975 | Nissan | 252/466 PT |
| 4,006,103 | 2/1977 | Meguerian | 252/438 |
| 4,027,002 | 5/1977 | Powlesland et al. | 502/517 X |
| 4,089,809 | 5/1976 | Farrior | 502/406 |
| 4,157,316 | 6/1979 | Thompson et al. | 502/304 |
| 4,206,087 | 6/1980 | Englehard | 252/462 |
| 4,253,992 | 3/1981 | Soejima et al. | 502/337 X |
| 4,315,895 | 2/1982 | Bramer et al. | 422/180 X |
| 4,489,047 | 12/1984 | DeJong et al. | 502/517 X |
| 4,504,598 | 3/1985 | Ono et al. | 502/304 X |
| 4,591,580 | 5/1986 | Kim et al. | 502/303 |

FOREIGN PATENT DOCUMENTS

| | | |
|---|---|---|
| 244127 | 4/1987 | European Pat. Off. . |
| 3223500 | 6/1982 | Fed. Rep. of Germany . |
| 2298367 | 1/1976 | France . |
| 1415757 | 11/1973 | United Kingdom . |

*Primary Examiner*—W. J. Shine
*Attorney, Agent, or Firm*—Edward J. Cabic

[57] ABSTRACT

An add-on H$_2$S trap for use after an auto exhaust catalyst has an H$_2$S-getter metal oxide which traps the H$_2$S by the following reaction:

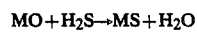

and the H$_2$S-getter metal oxide is self-regenerating via the following reaction:

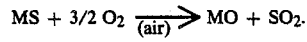

The H$_2$S-getter metal oxide has little tendency to form sulfates at a temperature greater than approximately 500° C. Preferred metal oxides are iron, nickel and cobalt and they can be distended over a support.

16 Claims, No Drawings

ADD-ON HYDROGEN SULFIDE TRAP

CROSS REFERENCE TO RELATED APPLICATIONS

G. Kim et al in U.S. Ser. No. 72,382 filed July 10, 1987, disclose a catalyst for controlling auto exhaust emissions which include hydrogen sulfide.

BACKGROUND OF THE INVENTION

1. Field of the Invention

This invention relates to an $H_2S$-gettering system for use in automobile engine exhaust systems.

2. Description of the Previously Published Art

It is well-known that hydrogen sulfide ($H_2S$) is generated by the catalytic converters where the air-to-fuel ratio deviates significantly to the rich side while the converter remains hot. It is generally believed that a higher than usual level of $H_2S$ released from the new breed of advanced auto exhaust catalysts is related to the higher than conventional level of rare earth oxides, especially ceria, formulated into the advanced emission control catalysts.

The mechanism for $H_2S$ generation currently accepted involves a sequence of events. First, $SO_2$ present in the auto exhaust stream, at about 20 ppm on the average, is oxidized to $SO_3$ under lean conditions. This $SO_3$ is readily captured by the catalyst where it forms sulfates of base metal oxides such as rare earth oxides and alumina. The sulfates which are stored in the catalyst are then reduced when the condition is sufficiently rich (i.e., the catalyst is exposed to a sufficiently reducing condition), to form $H_2S$ as one of the reaction products. Such a situation arises when an automobile is suddenly decelerated or stopped after a period of high speed cruising.

To entirely eliminate or to decrease the level of $H_2S$ emission low enough to avoid creating $H_2S$ odor there would seem to be two possible approaches. The first would be based on a chemical modification of the existing auto exhaust catalysts, typically today's three-way catalyst (TWC) or catalysts operated under a closed-loop condition. It is, however, not an easy task to develop an auto exhaust catalyst that meets the requirements for both the long-term catalytic performance for three-way conversions as well as $H_2S$ because the optimal catalytic performance of the existing catalysts for three-way conversions is bound to be sacrificed by a chemical modification introduced to the catalyst to meet the requirement for $H_2S$.

The second approach would be based on some type of auxiliary device to be used with catalytic converters for solving the $H_2S$ problem.

3. Objects of the Invention

It is an object of this invention to add an effective $H_2S$ gettering material to an engine exhaust system.

It is a further object of this invention to add an $H_2S$ gettering device to an engine exhaust system, without interfering with or jeopardizing the normal function of the existing catalytic converter system.

It is a further object of this invention to select the most suitable ingredients required for an add-on $H_2S$ trap.

It is a further object of this invention to obtain a method whereby the efficiency of this add-on $H_2S$ trap can be increased.

It is a further object of this invention to produce an $H_2S$ trap where an appropriate metal oxide is deposited on a support and where the metal oxide is in a partially reduced state.

These and further objects will become apparent as the description of the invention proceeds.

SUMMARY OF THE INVENTION

The level of $H_2S$ released from catalytic converters can be drastically lowered by adding a relatively small volume of an $H_2S$ trap having $H_2S$ gettering metal oxides which are used alone or preferably distended over a suitable support where the support can be in the form of a washcoat on a substrate. Examples of these metal oxides are the oxides of iron, cobalt and nickel with the preferred ones being iron and/or nickel oxides. This add-on $H_2S$ trap is an advantageous system improvement because there is no need for chemical modification of existing catalysts to take care of the unwanted $H_2S$.

The preferred $H_2S$ gettering metal oxides (MO, a simplified representation of the general formula $M_iO_j$, where i and j are positive integers) are self-regenerating via the following reactions:

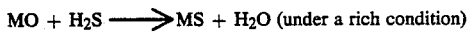

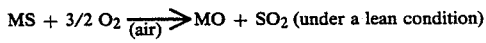

and where the metal oxide has preferably little or no tendency to form sulfates at 500° C. or higher temperatures. If sulfates were formed they would block the MO sites and thus decrease the number of MO sites for $H_2S$ trapping. The significance of 500° C. comes from vehicle tests where it is observed that there is virtually no $H_2S$ odor problem when the catalyst bed temperature in the converter is approximately 500° C. or lower.

DESCRIPTION OF THE PREFERRED EMBODIMENTS

The add-on $H_2S$ trap has as its active component one or more $H_2S$ gettering metal oxides having the reaction capabilities as described above.

This $H_2S$ gettering metal oxide may be used alone such as the case of steel wool which has been oxidized to iron oxide or in the more preferred embodiments, it may be distended over a support. One type of support is the low surface area support such as the metal or ceramic monolith. These support materials have low surface areas of less than 10 m²/g. In order to provide an even greater dispersion of the $H_2S$ gettering metal oxide, an even more preferred embodiment is to distend the $H_2S$ gettering oxide over a thermally stable material having a high surface area. These porous type materials which have a surface area of from 20 to 300 m²/g, preferably from 70 to 200 m²/g, are alumina, alumina-silica, silica, alumina-zirconia, titania, alumina-titania, boria-alumina, titania-silica, zirconia-silica and mixtures of these materials. These thermally stable materials may be used either as the entire support where they could be fabricated as beads or extrusions, or these thermally stable materials may be used as a washcoat which is placed on a monolith type substrate. Examples of the monolith substrate are a metal monolith or a ceramic monolith such as a cordierite monolith. The alumina on the metal monolith can be in the form of an alumina clad metal monolith or an aluminized metal. The $H_2S$ trap for an engine exhaust system can be in form of a plug which is made up of the monolith structure having deposited thereon an $H_2S$-gettering metal oxide.

The metal oxides to be used on the support must be capable of gettering the $H_2S$. Nickel and iron oxides are the most preferred $H_2S$ gettering ingredients. In the preferred embodiments where a transitional alumina is used as a support, cobalt oxide is generally not suitable because of its high tendency to form spinel, which renders the TWC performance poor. However, if the support is nonreactive to cobalt oxide, e.g. cordierite without washcoat, then cobalt oxide can be used as the $H_2S$ gettering metal oxide. The metal oxide are present in an amount of at least 1 g per liter and more preferably at least 10 g per liter of trap.

In addition to selecting the metal oxide on the basis of gettering $H_2S$, a further criteria to be considered is the extent to which the metal oxide will form a sulfate. Sulfur trioxide is formed on the catalyst surface and it has a very high probability of reacting instantly with base metal oxides, especially with rare earth oxides. Thus it has been presumed that virtually all of $SO_3$ formed on the catalyst, such as a TWC, will be confined within the catalytic converter in the form of sulfates. Should a very small fraction of $SO_3$ escape from the catalytic converter, there is a possibility for the material in the add-on $H_2S$ trap to form sulfates. This is especially true for an $H_2S$ gettering ingredient which has a high affinity toward capturing $SO_3$ under the operating conditions. Should any of the metal oxide (MO) ingredients form sulfates under a lean condition, i.e., during the periods of cruising, two things can happen. First, the $H_2S$ trapping capacity, which can be defined as the total number of exposed MO sites, decreases. That is, the $H_2S$ trap surface is partly in the form of exposed metal sulfate and of MO, e.g., $NiSO_4$ and NiO, rather than entirely of exposed MO. Once the $H_2S$ gettering MO forms its sulfate, it will remain as sulfate unless the exhaust gas temperature gets high enough to decompose the sulfate. Thus a portion of $H_2S$ trap surface cannot contribute to the $H_2S$ gettering, and hence, the $H_2S$ trapping capacity drops down, leading to a low $H_2S$ gettering efficiency. In this respect, iron oxide is the best of all metal oxides because, for example, ferric sulfate decomposes at 480° C. Furthermore, unlike nickel oxide, iron oxide poses no health hazard.

It is important to note here that the $H_2S$-gettering metal oxides in their working (i.e., active) state are oxygen deficient. For example, as illustrated in Example 5, iron oxide in its active form is $Fe_2O_{3-x}$, where $0<x<3$. Thus, magnetite ($Fe_3O_4$), a black oxide, which corresponds to $x=0.33$, is one of the active forms of iron oxides for gettering $H_2S$. Such an iron oxide can be readily prepared by a controlled reduction of ferric oxide (red) using either $H_2H_2O$ or $CO/CO_2$ as a reducing agent. In a preferred procedure for making the traps according to the present invention, the metal oxide can be partially reduced either before or after it is placed on the substrate. Such reduction is especially advantageous when using iron oxide although it does not appear to be so important when using nickel oxide.

The $H_2S$ traps of this invention are used in a method of collecting $H_2S$ from an auto exhaust system by passing the exhaust gas in contact with an exhaust gas catalyst and then passing the treated exhaust gas over the $H_2S$ trap.

Having described the basic aspects of our invention, the following examples are given to illustrate specific embodiments thereof.

EXAMPLE 1

An aqueous solution of nickelous nitrate bearing 0.152 g Ni per gram of solution was prepared by dissolving the salt in deionized water. To this solution was dipped a piece of 62 channels/$cm^2$ cordierite monolith without washcoat, 2.54 cm in O.D. and 1.27 cm in length. The excess solution was removed from the monolith by gentle blowing. After holding for 1 hour at room temperature, the monolith was dried at 135° C. Finally, the salt on the monolith was decomposed in 500° C. air for 1 hour. The resulting material had 0.305 g NiO on 6.43 $cm^3$ of base monolith.

EXAMPLE 2

In exactly the same manner as in Example 1, a piece of 2.54 cm O.D. and 0.635 cm long cordierite monolith with 62 channels/$cm^2$ was dipped into another portion of the nickelous nitrate solution of Example 1. The NiO pick-up on this 3.22 $cm^3$ of base monolith was 0.153 g.

EXAMPLE 3

Alumina-silica powder containing 4.9 wt% $SiO_2$ was air calcined for 1 hour at 871° C. The resulting material having 277 $m^2$/g BET ($N_2$) surface area was wet ball milled for 20 hours to obtain a slip containing 18% solid. A 2.54 cm O.D. and 0.635 cm long cordierite monolith with 45 channels/$cm^2$ was coated with this slip using the conventional procedure, dried at room temperature and then at 135° C. It was then exposed to 500° C. air for 1 hour. The weight gain resulting from this washcoating was 0.160 g. The washcoated monolith was dipped into a portion of the nickelous nitrate solution of Example 1. After removing the excess solution from the monolith by blowing with air, the monolith was held at room temperature for 1 hour, and then dried at 135° C. The salt on the monolith was decomposed by 1 hour exposure to 593° C. air. The NiO pick-up based on weight gain was 0.200 g.

EXAMPLE 4

Pseudo-boehmite alumina powder made according to the procedure described in U.S. Pat. No. 4,371,513 (Sanchez et al) was air calcined for 1 hour at 871° C. The resulting material having 153 $m^2$/g BET ($N_2$) surface area was wet ball milled for 20 hours to obtain a slip containing 18% solid. A piece of cordiertie monolith identical in quality and dimension to one described in Example 4 was coated with this slip and processed in the same manner as in Example 4 to pick up alumina and NiO. The alumina and NiO pick-ups based on weight gains were 0.147 g and 0.198 g, respectively.

EXAMPLE 5

A 2.54 cm O.D. and 1.27 cm long piece of cordierite monolith having 45 channels/$cm^2$ was coated with alumina slip identical to one described in Example 4, dried at room temperature and then at 135° C. It was then further exposed to 500° C. air for 1 hour. The weight gain resulting from this washcoating was 0.247 g. The washcoated monolith was dipped into a ferric nitrate solution and the excess solution was removed by gentle blowing, dried at room temperature for 1 hour, and then at 135° C. Ferric nitrate on the monolith was then decomposed by 1 hour exposure to 593° C. air. The ferric oxide, $Fe_2O_3$ (rusty red) pick-up based on weight gain was 0.118 g. The sample was then subjected to a reduction treatment in flowing $N_2$ (at a rate of 2 liters/min.)

containing approximately 5 vol.% $H_2$ and 20 vol.% steam at 560° C. for 1 hour. The resulting material was black iron oxide, which can be represented by $Fe_2O_{3-x}$, where $0<x<3$.

EXAMPLE 6

A fresh 8.5 cc sample of a three-way catalyst (TWC) which was an alumina-based noble metal catalyst promoted with rare earth oxides was evaluated for $H_2S$ with and without any add-on $H_2S$ trap of Examples 1–5 over the tail end of this control catalyst. The protocol for evaluating the catalyst and the efficiency of $H_2S$ trap chosen is as follows.

A sample of catalyst in any form, with or without the add-on $H_2S$ trap, was first exposed to a lean (net oxidizing) condition for 30 minutes, and then to a rich (net reducing) condition for 2 minutes under the test condition described in Table I below.

TABLE I

| Laboratory Test Conditions for $H_2S$ | | |
|---|---|---|
| Catalyst Charge, $cm^3$ | 8.5 | |
| Total Gas Flow Rate, liter (NTP)/min. | 4.25 | |
| GHSV | about 30,000 | |
| Feed Composition (vol %) | | |
| Component | Lean Condition | Rich Condition |
| CO | 0.18 | 5.00 |
| $H_2$ | 0.06 | 1.67 |
| HC ($C_3H_6/C_3H_8 = 3$) | 0.0400 | 0.0400 |
| $O_2$ | 1.26 | 0.22 |
| $CO_2$ | 14.5 | 14.5 |
| $H_2O$ | 10 | 10 |
| $SO_2$ | 0.0020 | 0.0020 |
| $N_2$ | Balance | Balance |
| Bed Temperature, °C. | 560 | 560 |
| $\Delta P$, inches of water | 9.5 | 11.0 |
| $H_2S$ Analyzer | Jerome, Model 621, with 300X dilution (3x dilution with $N_2$ coupled with two Jerom 10x dilution modules in series) | |

As soon as the operating condition is switched to the rich condition from the lean condition, 300-fold diluted sample of the outlet gas is sampled once every 10 seconds. The digital readout in ppb of $H_2S$ is converted to ppm $H_2S$ taking the dilution factor into account. The test condition was adjusted to allow sufficient accumulation of sulfate in the catalyst depending on the nature of the catalyst. This was done by using a relatively low space velocity under a sufficiently oxidizing condition to ensure a reasonably high degree of $SO_2$ oxidation. The results, as summarized in Table II below, clearly demonstrate that the use of an add-on $H_2S$ trap offers a practical solution to the $H_2S$ odor problem with catalytic converters. Note also that the efficiency of this trap increases with increasing number of sites on the trap of $H_2S$-gettering ingredients.

In analyzing the test results, the time for the peak level of $H_2S$ emission is related, in part, to the way the bench test unit is set up, e.g., the volume of preheater, total flow rate of feed gas, and the volume of sampling system, etc. Because the $H_2S$ odor must be more closely related to the level of peak $H_2S$ emission, the peak $H_2S$ levels are tabulated in Table II as an indication of the trap performance in $H_2S$. The $H_2S$ trapping efficiency is a method to express the $H_2S$ trapping of the various traps when compared to the case where no trap is used. Thus for the no trap case, the $H_2S$ ppm level is 193. For the trap of Example 1 the peak ppm is 9 so the amount removed is 193−9 or 184. The efficiency is then (184/193) 100=95%.

TABLE II

| | Efficiency of Add-on $H_2S$ Trap | | | | | |
|---|---|---|---|---|---|---|
| | $H_2S$ Trap | | | | | $H_2S$ Trapping |
| Preparation Example | Getter (g) | /Washcoat* (g) | Volume (cc) | GHSV | ppm $H_2S$ at Peak | Efficiency (%) |
| — | nil | nil | 0 | infinity | 193 | 0 |
| 1 | 0.31 | NiO/nil | 6.43 | 40,000 | 9 | 95 |
| 2 | 0.15 | NiO/nil | 3.22 | 80,000 | 68 | 65 |
| 3 | 0.20 | NiO/0.16 AS | 3.22 | 80,000 | 21 | 89 |
| 4 | 0.20 | NiO/0.15 A | 3.22 | 80,000 | 23 | 88 |
| 5 | 0.12 | $Fe_2O_3$/0.25 A | 6.43 | 40,000 | 46 | 76 |

*A (Alumina), AS (Alumina-Silica)

It is understood that the foregoing detailed description is given merely by way of illustration and that many variations may be made therein without departing from the spirit of this invention.

What is claimed is:

1. An assembly consisting essentially of a three way exhaust gas catalyst over which is passed an automobile exhaust gas to be treated and an $H_2S$ trap over which is passed the treated exhaust gas consisting essentially of a support, which is a metal monolith or a ceramic monolith, having distended thereover as the active $H_2S$ gettering component an $H_2S$-getter metal oxide (MO)

(a) which traps the $H_2S$ by the following reaction:

$$MO + H_2S \rightarrow MS + H_2O$$

(b) which self-regenerates via the following reaction:

$$MS + 3/2\, O_2 \xrightarrow{(air)} MO + SO_2 \text{ and}$$

(c) which has little tendency to form sulfates at a temperature greater than approximately 500° C.;

said trap device in said automobile engine exhaust system being capable of self regeneration with oxygen under a lean exhaust gas condition; and said trap device having the sole function of adsorbing $H_2S$ and not containing any additional exhaust gas catalysts.

2. An $H_2S$ trap assembly according to claim 1, wherein said $H_2S$-getter metal oxide is in a partially reduced state.

3. An $H_2S$ trap assembly according to claim 1, wherein said $H_2S$-getter metal oxide is selected from an oxide of a metal in the group consisting of iron, cobalt, nickel, and mixtures thereof.

4. An $H_2S$ trap assembly according to claim 1, wherein the support has a low surface area.

5. An $H_2S$ trap assembly according to claim 4, wherein the surface area is less than 10 $m^2/g$.

6. An $H_2S$ trap assembly according to claim 1, wherein the support has a high surface area from 20 to 300 $m^2/g$.

7. An $H_2S$ trap assembly according to claim 6, wherein the surface area is from 70 to 200 $m^2/g$.

8. An $H_2S$ trap assembly according to claim 6, wherein the metal monolith or ceramic monolith support having the high surface area has a thermally stable washcoat deposited thereon.

9. An $H_2S$ trap assembly according to claim 8, wherein the ceramic monolith is a cordierite monolith.

10. An $H_2S$ trap assembly according to claim 8, wherein the washcoat is a thermally stable material selected from the group consisting of alumina, alumina-silica, silica, alumina-zirconia, titania, alumina-titania, boria-alumina, titania-silica, zirconia-silica and mixtures thereof.

11. An $H_2S$ trap assembly according to claim 8, wherein the support comprises either (a) alumina on a metal monolith in the form of an alumina clad metal monolith or an aluminized metal or (b) alumina on a ceramic monolith.

12. An $H_2S$ trap assembly according to claim 1, wherein said $H_2S$-getter metal oxide is present in an amount of at least 1 g per liter of $H_2S$ trap.

13. An $H_2S$ trap assembly according to claim 12, wherein said $H_2S$-getter metal oxide is present in an amount of at least 10 g per liter of $H_2S$ trap.

14. An $H_2S$ trap assembly for an engine exhaust system according to claim 1, wherein the metal oxide is partially reduced either before or after depositing the metal oxide on the support.

15. An $H_2S$ trap assembly according to claim 14, wherein the metal oxide is iron oxide.

16. An $H_2S$ trap assembly according to claim 3, wherein the metal oxide is iron oxide and in the form of magnetite.

* * * * *